United States Patent
Urata et al.

(10) Patent No.: US 9,701,016 B1
(45) Date of Patent: Jul. 11, 2017

(54) DETECTION OF MOVABLE GROUND AREAS OF A ROBOT'S ENVIRONMENT USING A TRANSDUCER ARRAY

(71) Applicant: X Development LLC, Mountain View, CA (US)

(72) Inventors: Junichi Urata, Tokyo (JP); Yoshito Ito, Tokyo (JP)

(73) Assignee: X Development LLC, Mountain View, CA (US)

( * ) Notice: Subject to any disclaimer, the term of this patent is extended or adjusted under 35 U.S.C. 154(b) by 165 days.

(21) Appl. No.: 14/822,009

(22) Filed: Aug. 10, 2015

(51) Int. Cl.
*B25J 9/16* (2006.01)
*G01S 17/89* (2006.01)
*B25J 13/08* (2006.01)
*B25J 5/00* (2006.01)

(52) U.S. Cl.
CPC .......... *B25J 9/163* (2013.01); *B25J 5/00* (2013.01); *B25J 9/1664* (2013.01); *B25J 9/1674* (2013.01); *B25J 13/089* (2013.01); *G01S 17/89* (2013.01); *Y10S 901/01* (2013.01)

(58) Field of Classification Search
CPC ........ B25J 9/163; B25J 9/1666; B25J 9/1676; B25J 9/1674; B25J 9/1684; B25J 9/1664; B25J 5/00; B25J 13/089; G01S 17/89; Y10S 901/01
See application file for complete search history.

(56) References Cited

U.S. PATENT DOCUMENTS

| | | | |
|---|---|---|---|
| 4,821,206 A * | 4/1989 | Arora | B25J 9/1692 700/258 |
| 5,131,392 A * | 7/1992 | Jolesz | A61B 17/22004 324/309 |
| 6,154,134 A * | 11/2000 | Carmen | B60Q 5/001 340/540 |
| 8,473,102 B2 | 6/2013 | Andoh | |
| 8,693,730 B2 | 4/2014 | Umasuthan et al. | |
| 8,842,495 B2 * | 9/2014 | Hersey | G01S 7/536 367/118 |
| 2003/0014199 A1 * | 1/2003 | Toomey | G01H 9/002 702/56 |
| 2008/0109115 A1 | 5/2008 | Lim | |

(Continued)

*Primary Examiner* — Abby Lin
(74) *Attorney, Agent, or Firm* — McDonnell Boehnen Hulbert & Berghoff LLP (57) ABSTRACT

An example method for detecting a movable element on a surface involves receiving, from a depth sensor coupled to a mobile robot, a first depth measurement between the depth sensor and a ground surface. The method also involves causing at least one transducer coupled to the mobile robot to emit a directional pressure wave toward the ground surface. The method further involves receiving, from the depth sensor coupled to the mobile robot, a second depth measurement between the depth sensor and the ground surface after emitting the directional pressure wave. Additionally, the method involves identifying one or more differences between the first depth measurement and the second depth measurement indicating that the ground surface includes a movable element. Further, the method involves providing navigation instructions to the mobile robot based on the identified one or more differences between the first depth measurement and the second depth measurement.

20 Claims, 8 Drawing Sheets

(56) References Cited

U.S. PATENT DOCUMENTS

| | | | |
|---|---|---|---|
| 2009/0281839 A1* | 11/2009 | Lynn | G06F 19/321 |
| | | | 705/3 |
| 2013/0081479 A1* | 4/2013 | Miller | A61B 5/1113 |
| | | | 73/862.53 |
| 2013/0265854 A1* | 10/2013 | Hersey | B25J 9/1676 |
| | | | 367/99 |
| 2014/0163732 A1 | 6/2014 | Park et al. | |

* cited by examiner

DETECTION OF MOVABLE GROUND AREAS OF A ROBOT'S ENVIRONMENT USING A TRANSDUCER ARRAY

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

The present application discloses implementations that relate to detection of unstable surfaces within an environment. In one example, the present application describes a method. The method involves receiving, from a depth sensor coupled to a mobile robot, a first depth measurement between the depth sensor and a ground surface. The method also involves causing at least one transducer coupled to the mobile robot to emit a directional pressure wave toward the ground surface. The method further involves receiving, from the depth sensor coupled to the mobile robot, a second depth measurement between the depth sensor and the ground surface after emitting the directional pressure wave. Additionally, the method involves identifying one or more differences between the first depth measurement and the second depth measurement indicating that the ground surface includes a movable element. Further, the method involves providing navigation instructions to the mobile robot based on the identified one or more differences between the first depth measurement and the second depth measurement.

In another example, the present application describes a robot. The robot includes a depth sensor, at least one transducer, and a computing device. The depth sensor is configured to measure distances between the depth sensor and one or more surfaces in an environment. The environment includes a ground surface. The at least one transducer is configured to emit pressure waves. The computing device is configured to execute instructions that cause performance of a set of operations. The operations include obtaining, from the depth sensor, a first depth measurement between the depth sensor and the ground surface. The operations also include causing the at least one transducer to emit a directional pressure wave toward the ground surface. The operations further include obtaining, from the depth sensor, a second depth measurement between the depth sensor and the ground surface after causing the at least one transducer to emit the directional pressure wave. Additionally, the operations include identifying one or more differences between the first depth measurement and the second depth measurement indicating that the ground surface includes a movable element. Further, the operations include viding navigation instructions to the robot based on the identified one or more differences between the first depth measurement and the second depth measurement.

In still another example, the present application describes a non-transitory computer-readable medium having instructions stored thereon that, upon execution by at least one processor, causes a mobile robot to perform a set of operations. The operations include obtaining a first depth map of a ground surface proximate the mobile robot. The operations also include causing an array of transducers to emit a plurality of pressure waves in accordance with a timing sequence. The plurality of pressure waves collectively form a directional pressure wave directed toward the ground surface. The operations further include obtaining a second depth map of the ground surface after the directional pressure wave reaches the ground surface. Additionally, the operations include identifying one or more differences between a first area of the first depth map and a corresponding second area of the second depth map. Further, the operations include providing navigation instructions to the mobile robot based on the identified one or more differences between the first depth map and the second depth map.

In yet another example, the present application describes a system. The system includes a means for receiving, from a depth sensor coupled to a mobile robot, a first depth measurement between the depth sensor and a ground surface. The system also includes a means for causing at least one transducer coupled to the mobile robot to emit a directional pressure wave toward the ground surface. The system further includes a means for receiving, from the depth sensor coupled to the mobile robot, a second depth measurement between the depth sensor and the ground surface after emitting the directional pressure wave. Additionally, the system includes a means for identifying one or more differences between the first depth measurement and the second depth measurement indicating that the ground surface includes a movable element. Further, the system includes a means for providing navigation instructions to the mobile robot based on the identified one or more differences between the first depth measurement and the second depth measurement.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

I. Overview

The present application discloses implementations that relate to detection of unstable surfaces within an environment. A mobile robot may encounter a variety of terrains. Some terrains—such as pavement, asphalt, cement, and wood—are stable and solid and may be confidently stepped on. However, other terrains may be unstable or include movable elements—such as carpet, grass, or other vegetation—which may cause the robot to slip or misstep. Thus, it may be desirable for the robot to either avoid stepping onto such unstable surfaces, or to modify its stepping behavior in order to maintain stability.

An example embodiment involves a robot with a depth sensor and a transducer. The depth sensor first measures a distance between the sensor and a particular location on the ground proximate the robot. Then, the transducer is operated to emit a pressure wave directed toward that particular location on the ground. The depth sensor then performs another distance measurement on that particular location on the ground. A control system of the robot may then determine whether there are any differences between the two depth measurements. If there is at least one identified difference between the two depth measurements, a movable feature may have been detected at that particular location. Upon detecting the movable feature, the control system may instruct the robot to avoid that particular location on the ground and/or otherwise modify the robot's stepping behavior.

In some embodiments, the robot may include a plurality of transducers arranged as an array, each of which can be operated independently. Once the particular location on the ground has been identified, selected, or determined, a control system of the robot may determine a phase timing with which to operate the transducer array. By operating the transducer array in this manner, relatively weak individual pressure waves emitted by each transducer may constructively interfere at a particular focal point to form a stronger and directed pressure wave. A known relationship between the arrangement of the transducers and the speed of the pressure wave in the air (or other medium) may enable a control system to calculate the phase timing necessary to direct the pressure wave at a desired focal point. The operating principle behind a phased transducer array is described in more detail with respect to FIG. 5.

In some embodiments, the depth sensor may be configured to capture a depth map that includes a set of spatially-mapped distance measurements for an area near the robot. When detecting movable elements on ground surfaces, the depth sensor may capture two depth maps—one before the pressure wave is emitted, and another after the pressure wave is emitted. A control system of the robot may then compare the two depth maps and identify any differences between the two depth maps. If the depth maps are different, the control system may determine that a movable feature has been detected and accordingly instruct the robot and/or modify the robot's stepping behavior.

If a movable feature is detected on a ground surface on which the robot has been instructed to step on, a variety of navigation instructions may be provided to the robot. In some cases, the robot's behavior and trajectory may remain unchanged. In other cases, the robot's trajectory and/or planned stepping route may be modified in order to avoid stepping onto the ground surface containing the movable feature. Alternatively, the robot's stepping behavior may be modified to proceed cautiously onto the ground surface containing the movable feature. As one example, the robot may be instructed to more slowly lower its foot onto the ground surface until it is firmly planted onto the stable portion of the ground surface beneath the movable feature. The robot's stepping pattern may become shorter, and/or the robot's velocity may be reduced. In some instances, the information indicating that a movable feature has been detected may be provided to other planning or control systems of the robot and be considered with other information about the environment.

II. Example Robotic Systems

Figure 1:
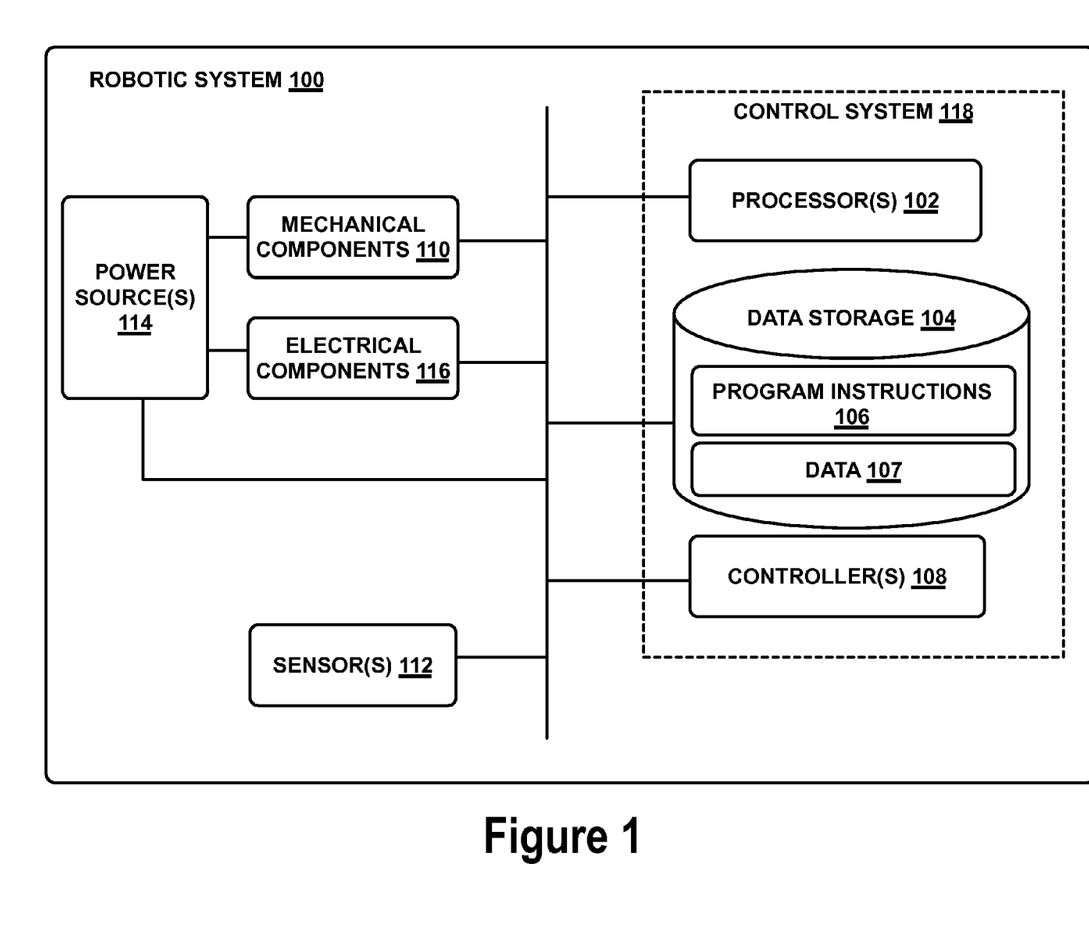
FIG. 1 illustrates a configuration of a robotic system, according to an example embodiment.

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication.

As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, biped and quadruped implementations of the robotic system 100 are described below.

Figure 2:
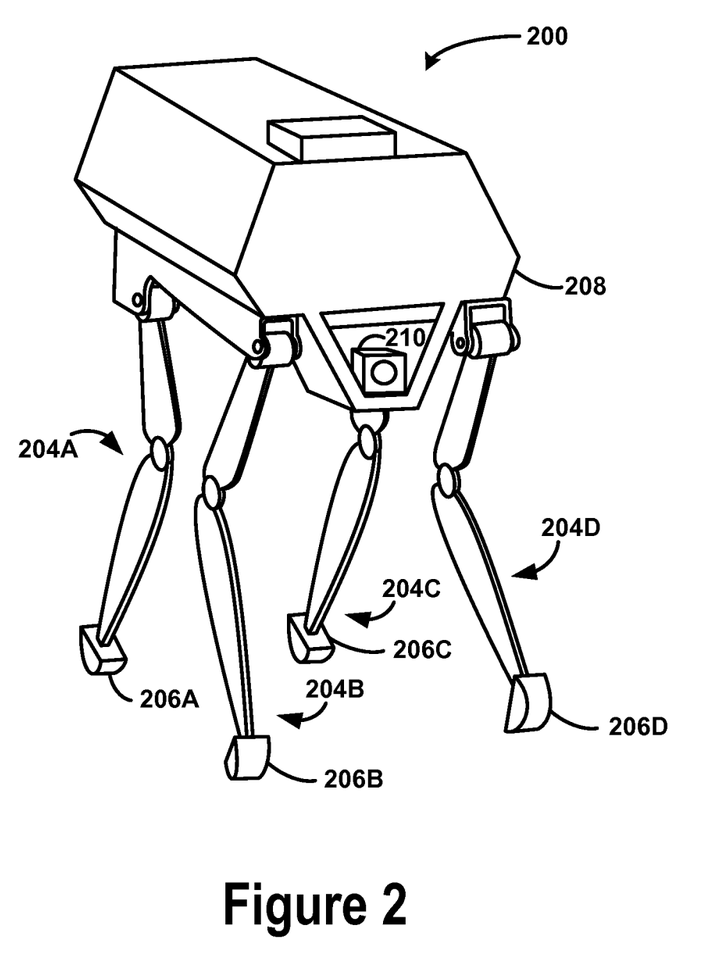
FIG. 2 illustrates a perspective view of a quadruped robot, according to an example embodiment.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems.

The configuration, position, and/or structure of the legs 204A-204D may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
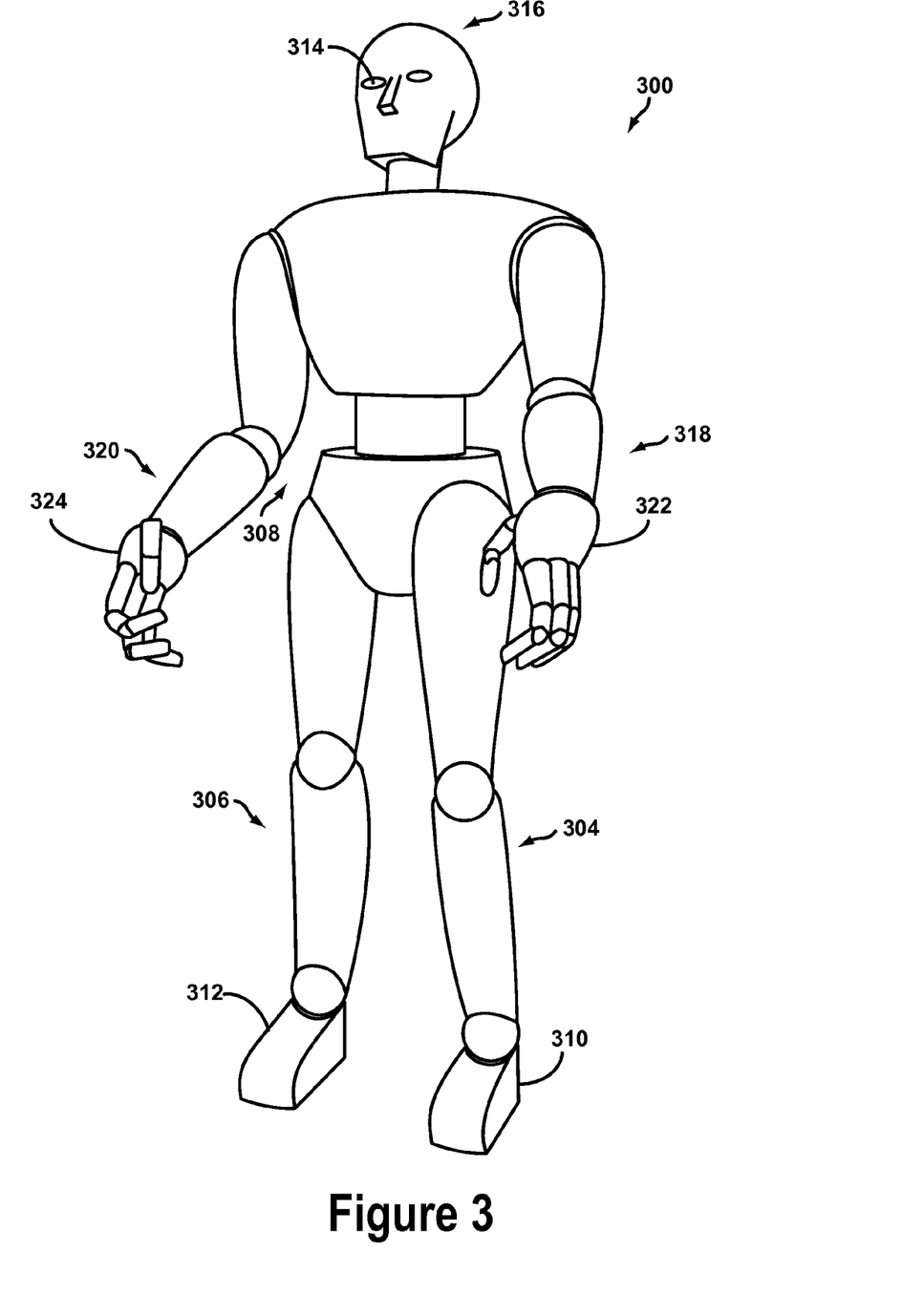
FIG. 3 illustrates a perspective view of a biped robot, according to an example embodiment.

FIG. 3 illustrates a biped robot 300 according to another example implementation. Similar to robot 200, the robot 300 may correspond to the robotic system 100 shown in FIG. 1, and may be configured to perform some of the implementations described herein. Thus, like the robot 200, the robot 300 may include one or more of mechanical components 110, sensor(s) 112, power source(s) 114, electrical components 116, and/or control system 118.

For example, the robot 300 may include legs 304 and 306 connected to a body 308. Each leg may consist of one or more members connected by joints and configured to operate with various degrees of freedom with respect to one another. Each leg may also include a respective foot 310 and 312, which may contact a surface (e.g., the ground surface). Like the robot 200, the legs 304 and 306 may enable the robot 300 to travel at various speeds according to the mechanics set forth within gaits. The robot 300, however, may utilize different gaits from that of the robot 200, due at least in part to the differences between biped and quadruped capabilities.

The robot 300 may also include arms 318 and 320. These arms may facilitate object manipulation, load carrying, and/or balancing for the robot 300. Like legs 304 and 306, each arm may consist of one or more members connected by joints and configured to operate with various degrees of freedom with respect to one another. Each arm may also include a respective hand 322 and 324. The robot 300 may use hands 322 and 324 for gripping, turning, pulling, and/or pushing objects. The hands 322 and 324 may include various types of appendages or attachments, such as fingers, grippers, welding tools, cutting tools, and so on.

The robot 300 may also include sensor(s) 314, corresponding to sensor(s) 112, and configured to provide sensor data to its control system. In some cases, the locations of these sensors may be chosen in order to suggest an anthropomorphic structure of the robot 300. Thus, as illustrated in FIG. 3, the robot 300 may contain vision sensors (e.g., cameras, infrared sensors, object sensors, range sensors, etc.) within its head 316.

III. Example Methods

Figure 4:
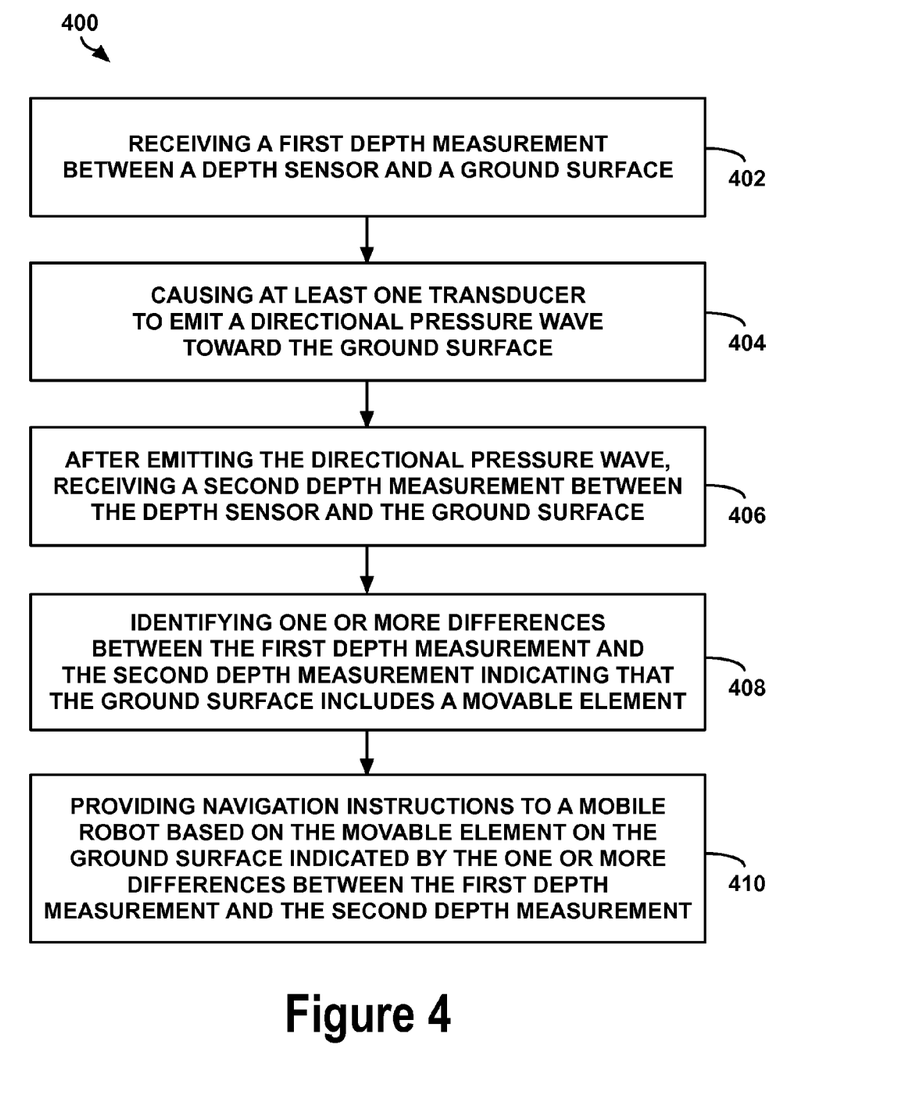
FIG. 4 illustrates a flowchart, according to an example embodiment.

FIG. 4 illustrates a flowchart of an example method 400 for detecting a movable element on a ground surface, according to an example embodiment. Method 400 shown in FIG. 4 presents an embodiment of a method that could be used or implemented by the robot 200 of FIG. 2 and/or the robot 300 of FIG. 3, for example, or more generally by one or more components of any computing device. Method 400 may include one or more operations, functions, or actions as illustrated by one or more blocks of 402-410. Although the blocks are illustrated in a sequential order, these blocks may also be performed in parallel, and/or in a different order than those described herein. Also, the various blocks may be combined into fewer blocks, divided into additional blocks, and/or removed based upon the directed implementation.

In addition, the method 400 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical operations or steps in the process. The program code may be stored on any type of computer-readable medium, for example, such as a storage device included a disk or hard drive. The computer-readable medium may include a non-transitory computer-readable medium, for example, such as computer-readable media that stores data for short periods of time like register memory, processor cache and/or random access memory (RAM). The computer-readable medium may also include non-transitory media, such as secondary or persistent long-term storage, like read-only memory (ROM), optical or magnetic disks, and compact-disc read-only memory (CD-ROM), for example. The computer-readable media may be considered a computer-readable storage medium, for example, or a tangible storage device.

In addition, for the method 400 and other processes, methods, and operations described herein, each block in FIG. 4 may represent circuitry that is wired to perform the specific logical operations in the process.

In one embodiment, operations of the method 400 may be performed by a control system, such as control system 118 of FIG. 1. In other embodiments, the operations of method 400 may be distributed across multiple control systems that are interfaced with the depth sensor and transducers in order to perform the specified actions.

At block 402, the method 400 involves receiving a first depth measurement between a depth sensor and a ground surface. The specific location of the ground surface may or may not be known before the first depth measurement is received. In some situations, the robot may be configured to assess the ground surfaces proximate the robot, in which case the ground surface's location may be selected as a part of a sweep across a larger area of ground surfaces, for example. In other situations, the ground surface's specific location may be selected because it is a step location that lies on the robot's planned trajectory. Regardless of the particular circumstance, the first depth measurement of the ground surface may be recorded by the depth sensor and provided to the robot's control system.

In some implementations, the first depth measurement is a single distance value indicative of a distance between the depth sensor and the ground surface (or a movable element present thereon). In other implementations, the first depth measurement includes a set of distance values that collectively form a depth map of the ground surface (and/or any movable elements present thereon). For the purposes of this application, "depth measurement" refers to any kind of depth information that may be collected by the depth sensor, including single measurements and/or depth maps.

At block 404, the method 400 involves causing at least one transducer to emit a directional pressure wave toward the ground surface. For the purposes of this application, a "pressure wave" may be any vibration within a medium (e.g., air, among other possible mediums). A pressure wave may possess one or more frequencies within the infrasound, acoustic, or ultrasonic range. Although the description herein may generally refer to pressure waves as ultrasound waves, a variety of frequencies may be utilized depending upon the particular implementation.

In some implementations the robot may utilize a monolithic transducer that is designed to emit a focused pressure wave. The monolithic transducer may be aimed toward a desired location on the ground in a number of ways. For example, the transducer may be mounted on a body of the robot, may be turned, rotated, or otherwise moved in order to aim the transducer toward a desired location on the ground. In another example, the transducer may be coupled to an actuated mount, which can be controlled to physically orient the transducer to a desired position.

In other implementations, the robot may utilize an array of transducers designed to produced a focused pressure wave by operating the transducers according to a specific phase timing. In one example, a control system of the robot may, based on a known three-dimensional position of a ground surface, generate a phase timing. When the transducer array is operated in accordance with the phase timing, the pressures waves emitted by each transducer in the array constructively interfere at or near the known three-dimensional position of the ground surface. In this manner, the transducer array may precisely "aim" the pressure wave at a desired location, without the need for any additional robotic movements or actuated mounts.

In some implementations, the pressure wave or waves produced by the at least one transducer are ultrasound waves. Unlike acoustic waves, some ultrasound waves may not be audible to humans, thereby allowing the robot to perform the techniques of the present application without producing a human-audible tone.

Regardless of the particular implementation, the pressure wave may be directed or otherwise form at or near the ground surface. The pressure wave may then interact with any movable features present on the ground surface. This interaction may perturb the movable feature, which may change its position. In some scenarios, many movable features may be present on the ground surface (e.g., many blades of grass), some of which are moved and while others are not moved.

At block 406, the method 400 involves receiving a second depth measurement between the depth sensor and the ground surface after emitting the directional pressure wave. If a movable feature is present on the ground surface and is perturbed through its interaction with the pressure wave, the second depth measurement may capture the depth of this feature in its new position.

In some embodiments, the point in time at which the second depth measurement is captured may be determined based on the first distance measurement. The first distance measurement may be indicative of a distance between the the depth sensor and the ground surface. Based on a known speed of the pressure wave and the distance to the ground surface, the control system may determine the length of time between the emission of the pressure wave and the point in time when the pressure wave reaches the ground surface. At or near the time when the pressure wave is expected to reach the ground surface, the depth sensor may capture the second depth measurement. Note that, in some cases, the distance between the at least one transducer and the ground surface may first be determined trigonometrically based on a known relative position of the at least one transducer and the depth sensor.

In some embodiments, two or more second depth measurements may be recorded at different points in time after the pressure wave has been emitted. Each of the two or more second depth measurements may be compared to the first depth measurement to determine whether any differences can be identified between them at block 408.

At block 408, the method 400 involves identifying one or more differences between the first depth measurement and the second depth measurement indicating that the ground surfaces includes a movable element.

In embodiments where the depth measurements are individual distance measurements, identifying one or more differences between them may involve determining whether or not the two measurements are the same. If the distance recorded by the first depth measurement differs from the distance recorded by the second depth measurement, the control system may consider the ground surface to include a movable element.

Alternatively, the two distances may be compared to determine whether they differ by at least a threshold amount. The depth sensor's measurements may be noisy, which might produce slight variations in the distance measurements. To account for this, a threshold distance difference may be set, which must be exceeded before the ground surface is determined to include a movable element. The threshold may be predetermined based on a number of factors, such as an expected environment, a tolerance of the controller, and/or a desired behavior of the robot, among other possible factors.

In other embodiments, a difference in depth between the two distance measurements may not lead to a binary decision as to whether or not the ground surface contains a movable element. Rather, in some embodiments, the extent of difference between the two distance measurements may serve as a basis for informing the robot of the degree to which the ground surface is unstable. For example, a short-fiber carpet may only produce a small difference (if any) between the two distance measurements, whereas a wild grass may produce a large difference between the two distance measurements. In this example, the small difference may indicate to a control system that the ground surface is only slightly unstable, while the large difference may indicate to the control system that the ground surface is very unstable.

In embodiments where the depth measurements are depth maps, identifying one or more differences between them may involve determining a number of differences between the two depth maps. A given depth map may contain a set of distance measurements mapped to a respective set of spatial positions. Identifying a difference between the two depth maps may involve comparing a distance measurement in the first depth map corresponding to a particular spatial position to a distance map in the second depth map corresponding to that same spatial position. Such a comparison between the two depth maps may be repeated for each spatial position.

In some instances, the control system may determine that the ground surface contains a movable feature if a single difference is identified between the depth maps. In other instances, the control system may determine that the ground surface contains a movable feature if a threshold number of differences are identified between the depth maps. More complex comparisons also may be performed to quantitatively determine the extent of difference between two depth maps.

In some implementations, a given comparison between corresponding depth measurements of the two depth maps may only count as an "identified difference" if that difference exceeds a threshold amount. The number of "identified differences" may then be counted, the sum of which may serve as a basis for determining whether or not the ground surface includes thereon a movable feature.

Regardless of any threshold values and/or how a particular implementation defines an "identified difference," the results of the comparison between the depth measurements or depth maps may serve as a basis for characterizing the ground surface. The characterization may be whether or not the ground surface has thereon a movable element or feature. Other characterizations may indicate a degree to which the ground surface is unstable.

At block 410, the method 400 involves providing navigation instructions to a mobile robot based on the identified one or more differences between the first depth measurement and the second depth measurement.

In some embodiments, the navigation instructions may cause the robot to alter its trajectory or planned step path. For example, the navigation instructions may cause the robot to avoid stepping onto a ground surface determined to include a movable element. As another example, the navigation instructions may cause the robot to step over the ground surface. In instances where the robot has a trajectory planning system or other computing system, the navigation instructions may be supplied to that system of the robot in order to inform it of the characterization determined at block 408.

In some embodiments, the navigation instructions may modify the robot's stepping behavior, gait, speed, or other aspects of its movement. For example, the navigation instructions may cause the robot to step cautiously onto a ground surface determined to include a movable element. As another example, the navigation instructions may cause the robot to reduce its speed. As yet another example, the robot may alter its gait (e.g., from running to walking).

In some scenarios, the navigation instructions may not alter the robot's trajectory or behavior in any way. For example, the robot's control system may determine that the ground surface only has a small degree of instability which does not necessitate a change to the robot's gait, speed, stepping behavior, or trajectory. As another example, the robot's control system may determine that the ground surface is stable.

IV. Example Transducer Array Operation

Figure 5:
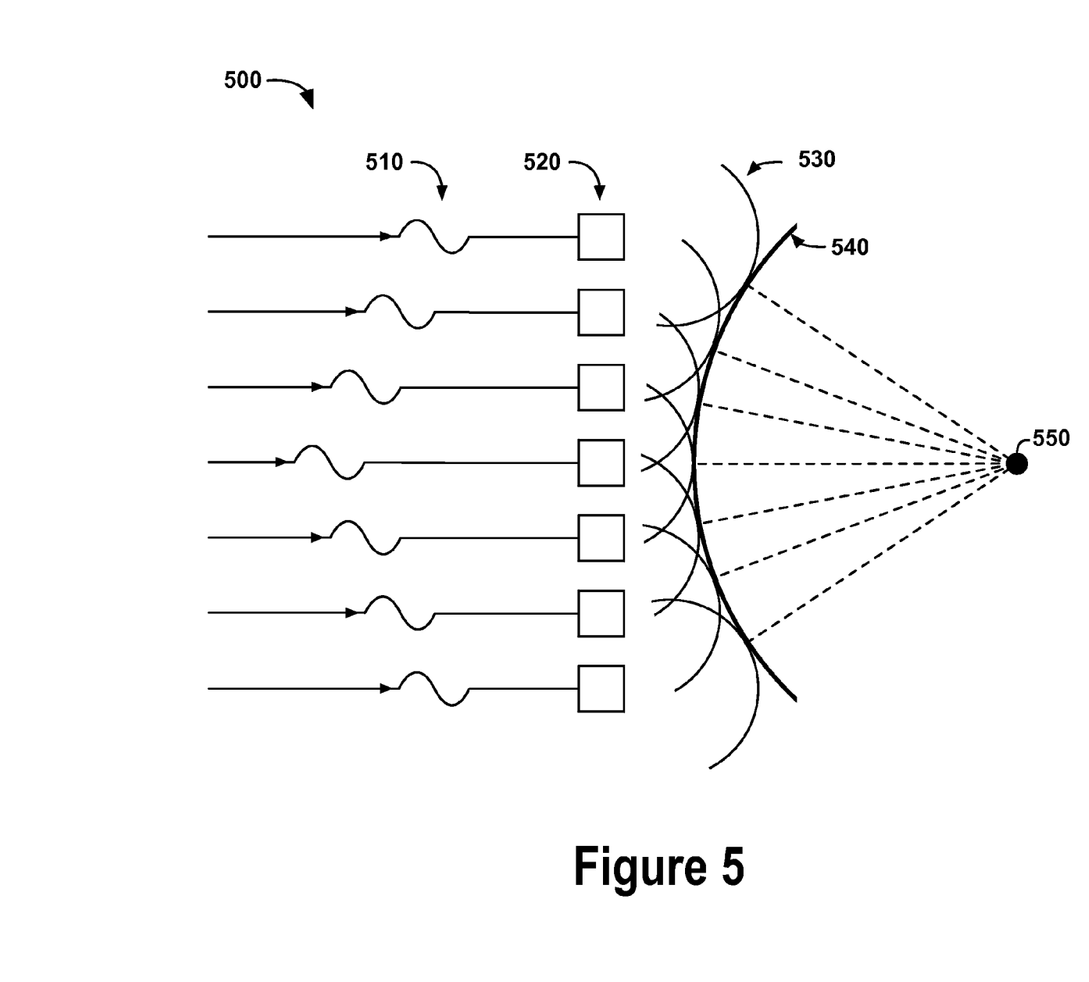
FIG. 5 is a conceptual illustration of an operation of a phased transducer array, according to an example embodiment.

FIG. 5 is a conceptual illustration 500 of an operation of a phased transducer array, according to an example embodiment. In some embodiments, a robot may have coupled thereto a phased transducer array operated by a control system of the robot. The phased transducer array may be operated according to a phase timing in order to produce directional waves aimed toward a focal point. FIG. 5 illustrates a conceptual, two-dimensional illustration 500 of the operating principle behind a phased transducer array.

As shown in FIG. 5, a set of signals 510 are provided to a corresponding set of transducers 520. The signals 510 have a specific phase timing as shown in illustration 500. The top and bottom signals of signals 510 arrive at the respective top and bottom transducers of transducers 520 first. Then, after a delay, the signal that is second from the top and the signal that is second from the bottom arrives at their respective transducers. After yet another delay, the signal that is third from the top and the signal that is third from the bottom arrives at their respective transducers. Finally, after another delay, the middle signal arrives at the middle transducer.

When a signal arrives at its respective transducer, a pressure wave is emitted from that respective transducer. After all of the signals have reached their respective transducers, a set of pressure waves 530 are emitted that collectively form a wavefront 540. Because the pressure waves were emitting according to the phase timing, the wavefront 540 focuses over time to focal point 550. The focal point 550 represents a position at which the entire set of pressure waves 530 constructively interfere. The resulting pressure wave at the focal point 550 may have a greater amplitude than each individual pressure wave of the set of pressure waves 530.

Note that the conceptual illustration 500 depicts one example of how phase timing can be used to generate a collective pressure wave at a particular location using a set of individual pressure waves. The phase timing can be varied in order to select a variety of focal points at various locations in space. Additionally, while the conceptual illustration 500 shows a two-dimensional example of a phased transducer array, any two- or three-dimensional arrangement of transducers may be utilized to implement a phased transducer array. As an example, employing a phase timing for a three-dimensional arrangement of transducers may generate a set of pressure waves that constructively interfere at a three-dimensional point in space. It should be understood that, although some examples and figures described herein may refer to or illustrate two-dimensional examples, the techniques of the present application may be applied in three dimensions.

Note that the conceptual illustration 500 is merely illustrative and may not necessarily be drawn to an accurate scale. The illustration 500 of FIG. 5 is provided to facilitate understanding of implementations of the present application that utilize a phased transducer array.

V. Example Scenario

Figure 6A:
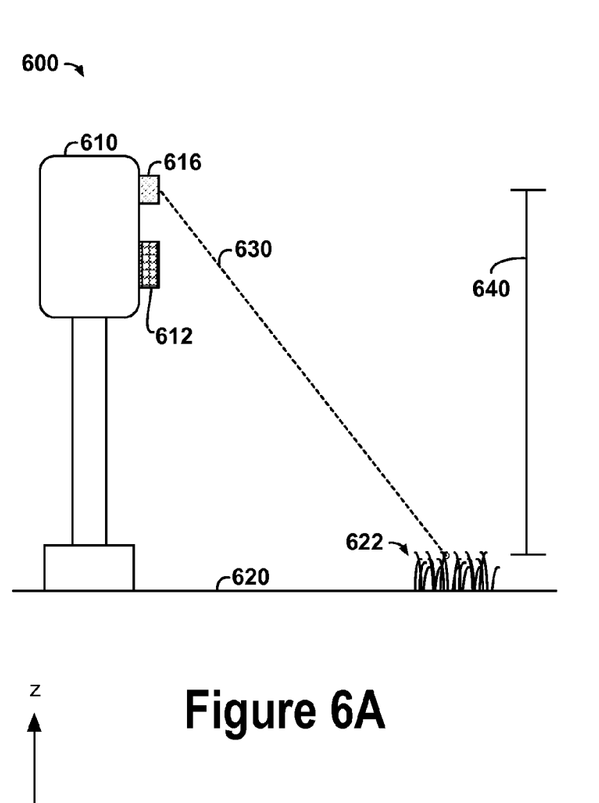
FIG. 6A illustrates an example operation of a robot at a first time, according to an example embodiment.
Figure 6B:
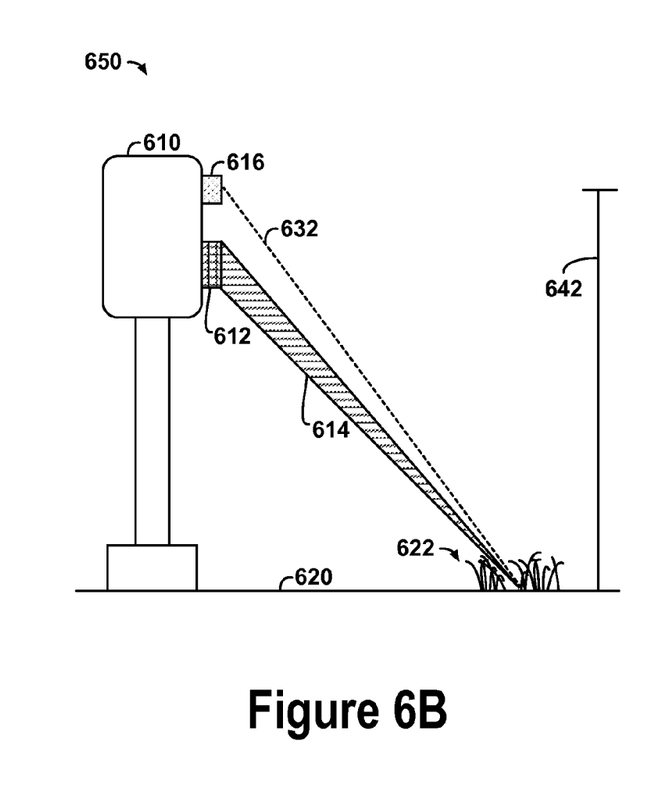
FIG. 6B illustrates an example operation of a robot at a second time, according to an example embodiment.

FIG. 6A and FIG. 6B depict a scenario in which techniques of the present application may be used at two different points in time. The robot 610 may be similar to robot 200 of FIG. 2, robot 300 of FIG. 3, and/or may include any combination of components of robot 200, robot 300, a transducer or transducer array as described herein, and/or a depth sensor as described herein. In the depicted scenario, a robot 610 encounters an environment containing grass 622 on ground surface 620. The robot 610 utilizes techniques of the present application in order to detect the presence of movable elements—in this example, the grass 622—on the ground surface 620. Note that, while the following describes the robot 610 performing a variety of actions and controlling the transducer array 612 and depth sensor 616, a control system and/or computing device of the robot 610 may also carry out some or all of these operations.

FIG. 6A illustrates an example operation of a robot at a first time 600, according to an example embodiment. First, the robot 610 uses the depth sensor 616 measures the depth measurement 630 of the grass 622. In some instances, the robot 610 also determines the height 640 of the grass 622 with respect to the depth sensor 616 based on a trigonometric relationship between the depth sensor 616 and the known position of the grass 622.

Then, as shown in FIG. 6B, the robot 610 controls the transducer array 612 to emit a pressure wave 614 directed toward the grass 622 at a second time 650. In some embodiments, the pressure wave is directed toward the grass 622 using phase timing techniques as described herein, or using other kinds of beamforming techniques. In this example, the pressure wave 614 interacts with the grass 622, perturbing it and causing the grass 622 to separate at the focal point of the pressure wave 614.

Then, the robot 610 uses the depth sensor 616 to measure the depth measurement 632 of the grass 622 while or after it has interacted with the pressure wave 622. In this example, because the grass 622 separated and revealed the ground surface 620 beneath it, the depth measurement 632 is larger than the depth measurement 630. In some instances, the robot 610 also determines the height 642 of the grass 622 after it has been perturbed, which may be similar to or the same as the height of the ground surface 620.

The robot 610 may then determine whether or not the location at which the depth sensor 616 was capturing depth measurements (in this example, the grass 622) includes a movable element. In one embodiment, the robot 610 compares the depth measurement 630 to the depth measurement 632 to determine if they are different. As previously described, the depth measurement comparison may simply determine whether the two depth measurements are the same, or determine whether the two depth measurements differ by a threshold amount. In another embodiment, the robot 610 may calculate a difference between the depth measurement 630 and the depth measurement 632 to determine the degree to which grass 622 is unstable.

Figure 7:
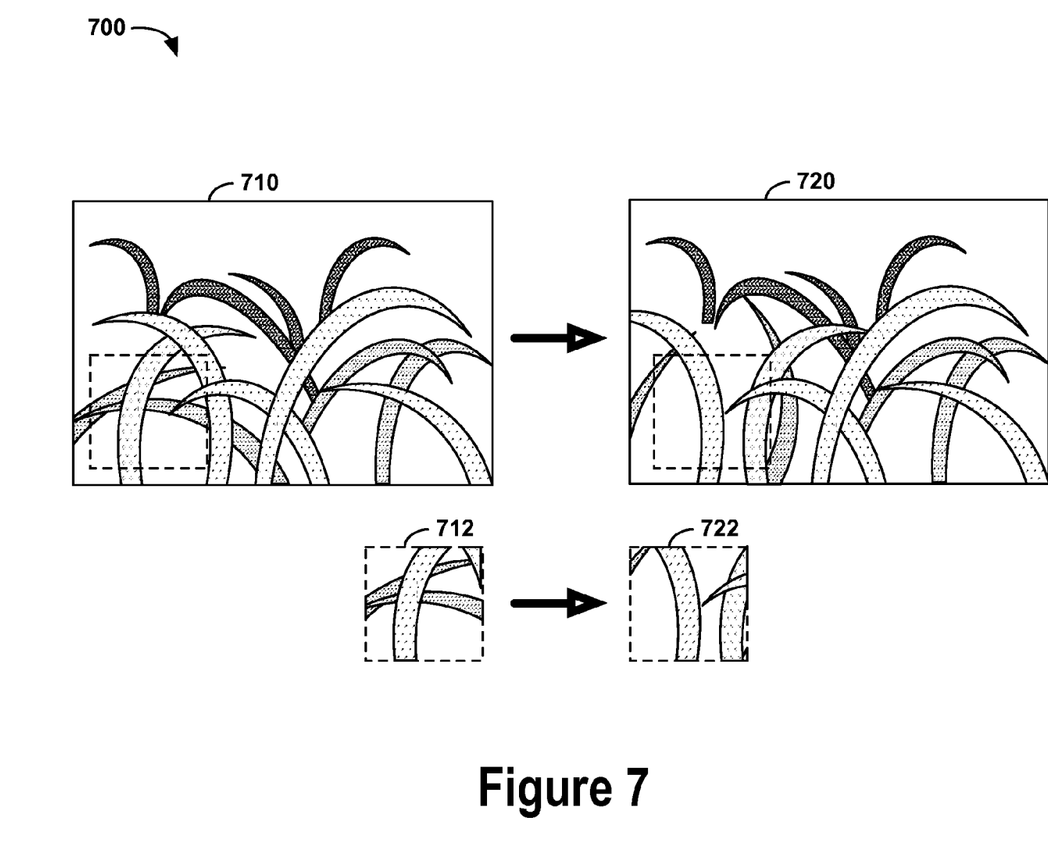
FIG. 7 illustrates comparison between a pair of depth maps, according to an example embodiment.

In other embodiments, the depth sensor 616 gathers depth maps of the grass 622 and compares a depth map captured at the first time 600 to another depth map captured at the second time 650. An example depth map comparison is illustrated in FIG. 7 and described in more detail below.

In instances where the robot 610 determines the height 640 and/or the height 642, the robot 610 may also use that determined height of the grass 622 as an input into a stepping controller or other control system. For example, upon detecting the movable feature of grass 622, the robot 610 may modify its stepping behavior to step more slowly onto the grass 622. The control system that implements this more cautious stepping behavior may move a foot of the robot quickly to some height at or above the determined height 640 and/or height 642, and then proceed to slowly lower the foot until it touches down onto the ground surface 620. In other examples, the robot 610 may implement other stepping controllers that utilize an estimated ground surface height (e.g., height 642) as a basis for controlling the robot's stepping behavior.

The depth sensor 616 may be any device capable measuring distances between the depth sensor 616 and surfaces within an environment. The depth sensor 616 may be a stereoscopic camera, an imaging device coupled with a structured light projector, a RADAR device, and/or a LIDAR device, among other possible depth sensors. The depth sensor 616 may be any other device utilizing stereo triangulation, structured or patterned light, time-of-flight, and/or interferometry techniques.

It should be understood that, although the scenario of FIG. 6A and FIG. 6B describes detecting grass 622 as a movable element, other movable elements or unstable features may be detecting using the techniques disclosed herein. A "movable element" may be any object, item, material, artifact, or other feature that may interact with, be perturbed by, or otherwise react to a pressure wave. The movable element may be partially fixed or secured onto the ground surface, in some instances. In other instances, the movable element may be on the ground surface, but is not affixed to it in any way, such as a loose object that landed onto the ground surface.

Note that, although the first time 600 and the second time 650 depict particular instances in time of the scenario shown in FIG. 6A and FIG. 6B, the first time 600 and/or the second time 650 may represent multiple operations of the robot 610 that occur over some period of time. It should be understood that the "first time" and "second time" distinguish between two states of the environment and may not necessarily represent a single point in time.

VI. Example Depth Map Comparison

FIG. 7 illustrates comparison 700 between a pair of depth maps, according to an example embodiment. Referring to FIG. 6, the depth sensor 616 of the robot 610 may capture depth map 710 at the first time 600, and depth map 720 at the second time 650 in this example. Depth map 710 depicts blades of grass 622 as seen from the perspective of the robot 610. The depth map 710 includes some lightly shaded blades of grass 622 which represent the blades of grass closest to the depth sensor 616, some medium shaded blades of grass 622 which represent blades of grass behind the lightly shaded blades of grass 622, and some darkly shaded blades of grass 622 behind the medium shaded blades of grass 622.

The comparison between the depth map 710 and the depth map 720 may be performed in a variety of ways. Each depth map may have a spatial resolution indicative of a discrete number of depth measurements included therein. Each individual depth measurement within depth map 710 may be compared against its corresponding depth measurement within depth map 720 for each spatial position. A control system may count the number of corresponding depth measurements between the depth map 710 and the depth map 720 that differ (by any amount, or by at least a threshold amount).

In some embodiments, a region of the depth map 710 and the depth map 720 may be compared. For example, as shown in FIG. 7, the region 712 of the depth map 710 may be compared against the corresponding region 722 of the depth map 720. In this example, the blades of grass 622 have moved about such that the region 712 and the region 722 no longer appear to be the same or similar, while other regions of the entire depth map 710 and depth map 720 appear unchanged between the two depth maps.

By comparing one or more regions of the depth map 710 to a corresponding set of regions in the depth map 720, a control system or computing device may be able to determine a number of regions (if any) between the two depth maps that differ. In some cases, one different region may be indicative of the presence of a movable element. In other cases, a threshold number of differing regions may indicate the presence of a movable element.

Regardless of the exact manner in which the two depth maps are compared, the present application discloses a robot, computing device, or control system identifying differences between the depth map 710 and the depth map 720, and using those identified differences as a basis for maintaining the robot's current control behavior, for modifying the robot's behavior, speed, step path, or trajectory, and/or for informing a control system of either the presence of a movable element and/or of a degree of instability of a ground surface.

Note that, although three distinct shading levels are depicted in FIG. 7, the depths of the blades of grass 622 may be determined with higher granularity. Additionally, a given blade of grass 622 may have multiple depths associated with it, such as if a given blade of grass bends away from the perspective of robot 610. The distinct shading levels and simplified depth representations of each blade of grass 622 is provided for the purposes of explanation and may or may not necessarily correspond to an actual depth map or scenario.

VII. Example Computer-Readable Medium

Figure 8:
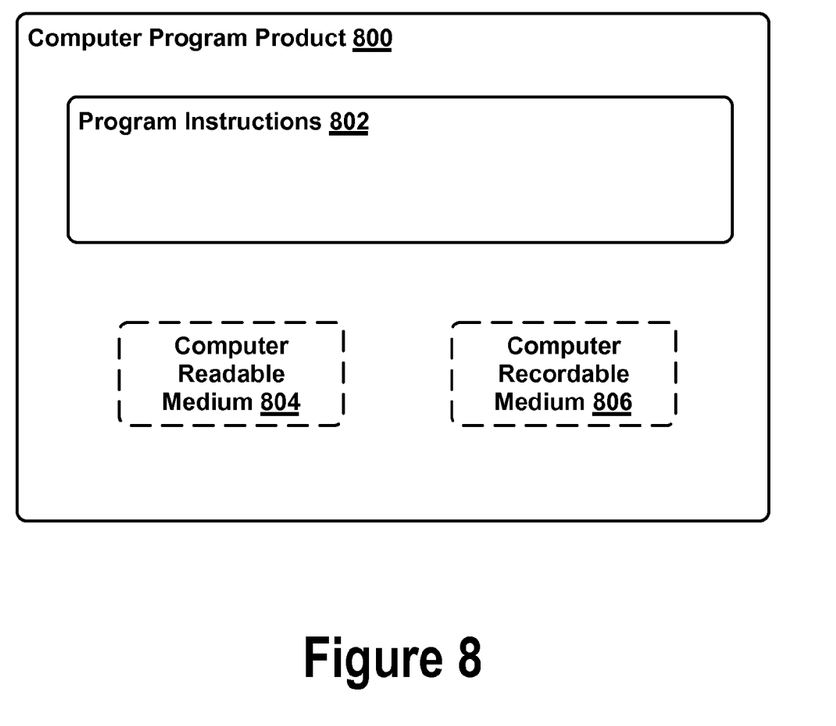
FIG. 8 illustrates an example computer-readable medium, according to an example embodiment.

FIG. 8 illustrates an example computer-readable medium configured according to at least some implementation described herein. In example implementations, the example system can include one or more processors, one or more forms of memory, one or more input devices/interfaces, one or more output devices/interfaces, and machine readable instructions that when executed by the one or more processors cause a robotic device to carry out the various operations, tasks, capabilities, etc., described above.

As noted above, the disclosed procedures can be implemented by computer program instructions encoded on a computer-readable storage medium in a machine-readable format, or on other media or articles of manufacture. FIG. 8 is a schematic illustrating a conceptual partial view of a computer program product that includes a computer program for executing a computer process on a computing device, arranged according to at least some implementations disclosed herein.

In some implementations, the example computer program product 800 may include one or more program instructions 802 that, when executed by one or more processors may provide functionality or portions of the functionality described above with respect to FIGS. 1-7. In some examples, the computer program product 800 may include a computer-readable medium 804, such as, but not limited to, a hard disk drive, a Compact Disc (CD), a Digital Video Disk (DVD), a digital tape, memory, etc. In some implementations, the computer program product 800 may include a computer recordable medium 806, such as, but not limited to, memory, read/write (R/W) CDs, R/W DVDs, etc.

The one or more program instructions 802 can be, for example, computer executable and/or logic implemented instructions. In some examples, a computing device is configured to provide various operations, or actions in response to the program instructions 802 conveyed to the computing device by the computer readable medium 804 and/or the computer recordable medium 806. In other examples, the computing device can be an external device in communication with a device coupled to the robotic device.

The computer readable medium 804 can also be distributed among multiple data storage elements, which could be remotely located from each other. The computing device that executes some or all of the stored instructions could be an external computer, or a mobile computing platform, such as a smartphone, tablet device, personal computer, or a wearable device, among others. Alternatively, the computing device that executes some or all of the stored instructions could be a remotely located computer system, such as a server. For example, the computer program product 800 can implement operations discussed in reference to FIGS. 4-7.

VIII. Conclusion

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A method comprising:
   receiving, from a depth sensor coupled to a mobile robot, a first depth measurement between the depth sensor and a ground surface;
   causing at least one transducer coupled to the mobile robot to emit a directional pressure wave toward the ground surface;
   after emitting the directional pressure wave, receiving, from the depth sensor coupled to the mobile robot, a second depth measurement between the depth sensor and the ground surface;
   identifying one or more differences between the first depth measurement and the second depth measurement indicating that the ground surface includes a movable element; and
   providing navigation instructions to the mobile robot based on the identified one or more differences between the first depth measurement and the second depth measurement.

2. The method of claim 1, wherein causing the at least one transducer to emit the directional pressure wave comprises:
   determining a timing sequence with which to operate the at least one transducer based on a position of the ground surface relative to the at least one transducer, wherein the timing sequence specifies a time delay and a duration with which to operate the at least one transducer, and wherein operating the at least one transducer according to the timing sequence produces one or more pressure waves that collectively form the directional pressure wave; and
   causing the at least one transducer to operate in accordance with the timing sequence.

3. The method of claim 2, wherein the at least one transducer is located at a known position relative to the depth sensor, and wherein the method further comprises:
   determining the position of the ground surface relative to the at least one transducer based on the first depth measurement and the known position of the at least one transducer relative to the depth sensor.

4. The method of claim 1, wherein causing the at least one transducer to emit the directional pressure wave comprises:
   determining a phase configuration with which to operate the at least one transducer based on a position of the ground surface relative to the at least one transducer, wherein the phase configuration specifies a phasing with which to operate the at least one transducer, and wherein operating the at least one transducer according to the phase configuration produces one or more pressure waves that collectively form the directional pressure wave; and
   causing the at least one transducer to operate in accordance with the phase configuration.

5. The method of claim 1, wherein the first depth measurement and the second depth measurement are distance measurements, and wherein identifying the one or more differences between the first depth measurement and the second depth measurement comprises:
  determining a change in distance between the first depth measurement and the second depth measurement; and
  determining that an absolute value of the change in distance is greater than a threshold amount, wherein the threshold amount is a predetermined distance threshold value.

6. The method of claim 1, wherein the first depth measurement is a first depth map and the second depth measurement is a second depth map, and wherein identifying the one or more differences between the first depth measurement and the second depth measurement comprises:
  identifying one or more differences between a first area of the first depth map and a corresponding second area of the second depth map.

7. The method of claim 1, wherein the navigation instructions cause the mobile robot to avoid stepping onto the ground surface.

8. The method of claim 1, wherein the navigations instructions cause the mobile robot to reduce a speed with which the mobile robot places an appendage onto the ground surface.

9. The method of claim 1, wherein the navigation instructions cause the mobile robot to (i) move an appendage above the ground surface and (ii) lower the appendage with a predetermined speed onto the ground surface until the appendage makes contact with a stable portion of the ground surface.

10. The method of claim 1, further comprising:
  determining a height of a stable portion of the ground surface based on at least one of the first depth measurement and the second depth measurement,
  wherein the navigation instructions are further based on the determined height of the stable portion of the ground surface.

11. The method of claim 1, wherein the directional pressure wave has a frequency within an ultrasonic range.

12. The method of claim 1, further comprising:
  obtaining a planned trajectory of the mobile robot indicative of an area of the ground surface on which the mobile robot is instructed to step; and
  causing the at least one transducer to emit the directional pressure wave toward the area of the ground surface defined by the planned trajectory.

13. A robot comprising:
  a depth sensor configured to measure distances between the depth sensor and one or more surfaces in an environment, wherein the environment includes a ground surface;
  at least one transducer configured to emit pressure waves; and
  a computing device configured to execute instructions that cause performance of the following operations:
    obtaining, from the depth sensor, a first depth measurement between the depth sensor and the ground surface;
    causing the at least one transducer to emit a directional pressure wave toward the ground surface;
    after causing the at least one transducer to emit the directional pressure wave, obtaining, from the depth sensor, a second depth measurement between the depth sensor and the ground surface;
    identifying one or more differences between the first depth measurement and the second depth measurement indicating that the ground surface includes a movable element; and
    providing navigation instructions to the robot based on the identified one or more differences between the first depth measurement and the second depth measurement.

14. The robot of claim 13, wherein the depth sensor is a stereoscopic camera.

15. The robot of claim 13, wherein the depth sensor is a LIDAR device.

16. The robot of claim 13, wherein the depth sensor comprises:
  an infrared pattern projector configured to project a known pattern onto the ground surface; and
  an imaging device configured to capture the known pattern projected onto the ground surface.

17. The robot of claim 13, wherein the at least one transducer is a monolithic ultrasonic transducer.

18. The robot of claim 13, wherein the at least one transducer is an array of ultrasonic transducers.

19. A non-transitory computer-readable medium having instructions stored thereon that, upon execution by at least one processor, causes a mobile robot to perform the following operations:
  obtaining a first depth map of a ground surface proximate the mobile robot;
  causing an array of transducers to emit a plurality of pressure waves in accordance with a timing sequence, wherein the plurality of pressure waves collectively form a directional pressure wave directed toward the ground surface;
  after the directional pressure wave reaches the ground surface, obtaining a second depth map of the ground surface;
  identifying one or more differences between a first area of the first depth map and a corresponding second area of the second depth map; and
  providing navigation instructions to the mobile robot based on the identified one or more differences between the first depth map and the second depth map.

20. The non-transitory computer-readable medium of claim 19, wherein the first depth map includes a first array of depth values, wherein the second depth map includes a second array of depth values, wherein the depth values in the first array correspond to the depth values in the second array, and wherein the operations further comprise:
  determining, for at least a threshold number of depth values, that a given depth value in the first array is different from the given depth value in the second array.

* * * * *